(12) United States Patent
Anderson et al.

(10) Patent No.: US 9,047,067 B2
(45) Date of Patent: Jun. 2, 2015

(54) SENSORLESS DETECTION AND MANAGEMENT OF THERMAL LOADING IN A MULTI-PROCESSOR WIRELESS DEVICE

(75) Inventors: Jon James Anderson, Boulder, CO (US); Michael K. Spartz, San Diego, CA (US); Christopher L. Medrano, Boulder, CO (US); Praveen Kumar Chidambaram, Boulder, CO (US)

(73) Assignee: QUALCOMM Incorporated, San Diego, CA (US)

(*) Notice: Subject to any disclaimer, the term of this patent is extended or adjusted under 35 U.S.C. 154(b) by 805 days.

(21) Appl. No.: 13/179,228

(22) Filed: Jul. 8, 2011

(65) Prior Publication Data

US 2012/0271480 A1    Oct. 25, 2012

Related U.S. Application Data

(60) Provisional application No. 61/478,169, filed on Apr. 22, 2011.

(51) Int. Cl.
*G06F 1/20* (2006.01)
*G06F 1/32* (2006.01)

(52) U.S. Cl.
CPC .............. *G06F 1/206* (2013.01); *G06F 1/3206* (2013.01); *G06F 1/329* (2013.01); *Y02B 60/144* (2013.01)

(58) Field of Classification Search
CPC ....... G05D 23/1934; G06F 1/26; G06F 1/206; G06F 1/324; G06F 1/3203; G06F 1/3287; G06F 1/329; G06F 1/3206; G09F 9/5038; Y02B 60/144

USPC .......... 700/299, 300; 702/104, 127, 136, 189; 717/127

See application file for complete search history.

(56) References Cited

U.S. PATENT DOCUMENTS

| | | | |
|---|---|---|---|
| 6,535,798 B1 * | 3/2003 | Bhatia et al. | 700/293 |
| 6,564,328 B1 * | 5/2003 | Grochowski et al. | 713/320 |
| 6,631,066 B1 | 10/2003 | Smith et al. | |
| 7,275,012 B2 | 9/2007 | Hermerding, II | |
| 7,586,382 B2 | 9/2009 | Wang et al. | |
| 7,596,430 B2 * | 9/2009 | Aguilar et al. | 700/299 |
| 7,606,566 B2 | 10/2009 | Ogoshi | |
| 8,695,008 B2 * | 4/2014 | Regini et al. | 718/104 |
| 8,942,857 B2 * | 1/2015 | Anderson et al. | 700/299 |

(Continued)

FOREIGN PATENT DOCUMENTS

EP       1182556 A2 * 2/2002
JP    2002202893 A    7/2002

(Continued)

OTHER PUBLICATIONS

International Search Report and Written Opinion—PCT/US2012/033194—ISA/EPO—Jul. 6, 2012.

*Primary Examiner* — Robert Fennema
*Assistant Examiner* — Jennifer L Norton
(74) *Attorney, Agent, or Firm* — Nicholas A. Cole

(57) ABSTRACT

A method and system for thermal mitigation in a personal computing device is disclosed. A signal associated with an electronic element in the portable computing device is monitored. A thermal condition indicating excessive heat production is determined in response to the monitored signal. An action to mitigate heat production in the portable computing device may be performed in response to the thermal condition.

32 Claims, 10 Drawing Sheets

(56) References Cited

U.S. PATENT DOCUMENTS

| | | |
|---|---|---|
| 2001/0003207 A1 | 6/2001 | Kling et al. |
| 2001/0047494 A1* | 11/2001 | Thomas et al. ............... 713/503 |
| 2002/0065049 A1 | 5/2002 | Chauvel et al. |
| 2003/0110012 A1* | 6/2003 | Orenstien et al. ............. 702/188 |
| 2004/0128100 A1* | 7/2004 | Rotem ......................... 702/136 |
| 2004/0128663 A1* | 7/2004 | Rotem ......................... 717/161 |
| 2004/0195674 A1* | 10/2004 | Gunther et al. ............... 257/706 |
| 2006/0095911 A1* | 5/2006 | Uemura et al. ............... 718/100 |
| 2007/0061021 A1* | 3/2007 | Cohen et al. .................... 700/30 |
| 2009/0322472 A1 | 12/2009 | MacDonald et al. |
| 2010/0073068 A1* | 3/2010 | Cho et al. ...................... 327/513 |
| 2012/0179416 A1* | 7/2012 | Anderson et al. ............. 702/130 |
| 2013/0013126 A1* | 1/2013 | Salsbery et al. .............. 700/299 |
| 2014/0236380 A1* | 8/2014 | Alton et al. ................... 700/299 |

FOREIGN PATENT DOCUMENTS

| | | |
|---|---|---|
| JP | 2008198072 A | 8/2008 |
| JP | 2008225590 A | 9/2008 |
| JP | 2012059033 A | 3/2012 |

* cited by examiner

SENSORLESS DETECTION AND MANAGEMENT OF THERMAL LOADING IN A MULTI-PROCESSOR WIRELESS DEVICE

PRIORITY AND RELATED APPLICATIONS

This patent application claims priority under 35 U.S.C. §119(e) to U.S. Provisional Patent Application Ser. No. 61/478,169 filed on Apr. 22, 2011, entitled, "SENSORLESS DETECTION AND MANAGEMENT OF THERMAL LOADING IN A MULTI-PROCESSOR WIRELESS DEVICE," the entire contents of which are hereby incorporated by reference.

DESCRIPTION OF THE RELATED ART

Portable computing devices (PCDs) are becoming necessities for people on personal and professional levels. These devices may include cellular telephones, portable digital assistants (PDAs), portable game consoles, palmtop computers, and other portable electronic elements.

In operation, the electronic circuitry within a PCD generates heat, which at excessive levels may be detrimental to the circuitry. The amount of heat that is generated may vary depending upon the operating conditions. For example, in an instance in which a PCD is wirelessly transmitting data for a sustained time period at a high power level, the power amplifier that feeds the antenna may generate a potentially detrimental amount of heat.

Some PCDs include thermal sensors positioned near the electronic circuitry that the PCD processor may monitor to determine if the PCD or portion thereof has reached a threshold or critical temperature above which the electronic circuitry may be harmed. When a reading of the thermal sensor indicates that a PCD has reached such a threshold temperature, the processor may initiate an action intended to reduce heat production or otherwise mitigate the effects of the heat. For example, the processor may temporarily reduce power to some of the electronics generating the heat, such as the power amplifier, in order to allow the PCD to dissipate the excess heat. Another action that the processor may take is to disable certain power-intensive functions, such as receiver diversity in a transceiver having a diversity receiver feature. Still another action that the processor may take is to reduce transmitter throughput.

The above-described method by which a PCD may actively reduce the amount of heat that it generates is only useful in a PCD that includes at least one operational thermal sensor. Some PCDs may not include any thermal sensors. Even if a PCD includes a thermal sensor, the PCD may not be able to determine which of the heat-generating elements in the PCD is primarily responsible for the temperature reaching a critical level. Furthermore, it is possible for a thermal sensor in a PCD to malfunction or otherwise become inoperable or unreliable.

SUMMARY OF THE DISCLOSURE

In one aspect, a method for thermal mitigation in a portable computing device is disclosed and may include monitoring a signal associated with an electronic element in the portable computing device, determining a thermal condition indicating excessive heat production in response to the signal, and performing an action to mitigate heat production in the portable computing device in response to the thermal condition. Since there is a relationship or correspondence between the signal and the amount of energy that the device draws or sinks in a given time period, the thermal condition of the device can be determined using the signal.

In another aspect, a computer system for thermal mitigation in a portable computing device is disclosed. The system may include a processor operable to monitor a signal associated with an electronic element in the portable computing device, determine a thermal condition indicating excessive heat production in response to the signal, and perform an action to mitigate heat production in the portable computing device in response to the thermal condition.

Further, the computer system for thermal mitigation in a portable computing device may include means for monitoring a signal associated with an electronic element in the portable computing device, means for determining a thermal condition indicating excessive heat production in response to the signal, and means for performing an action to mitigate heat production in the portable computing device in response to the thermal condition.

In still another aspect, a computer program product is disclosed and may include a computer-usable medium having computer-readable program code embodied therein. The computer readable program code may be adapted to execute and to implement a method for thermal mitigation in a portable computing device. The method implemented by the code may include monitoring a signal associated with an electronic element in the portable computing device, determining a thermal condition indicating excessive heat production in response to the signal, and performing an action to mitigate heat production in the portable computing device in response to the thermal condition.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

DETAILED DESCRIPTION

Figure 1:
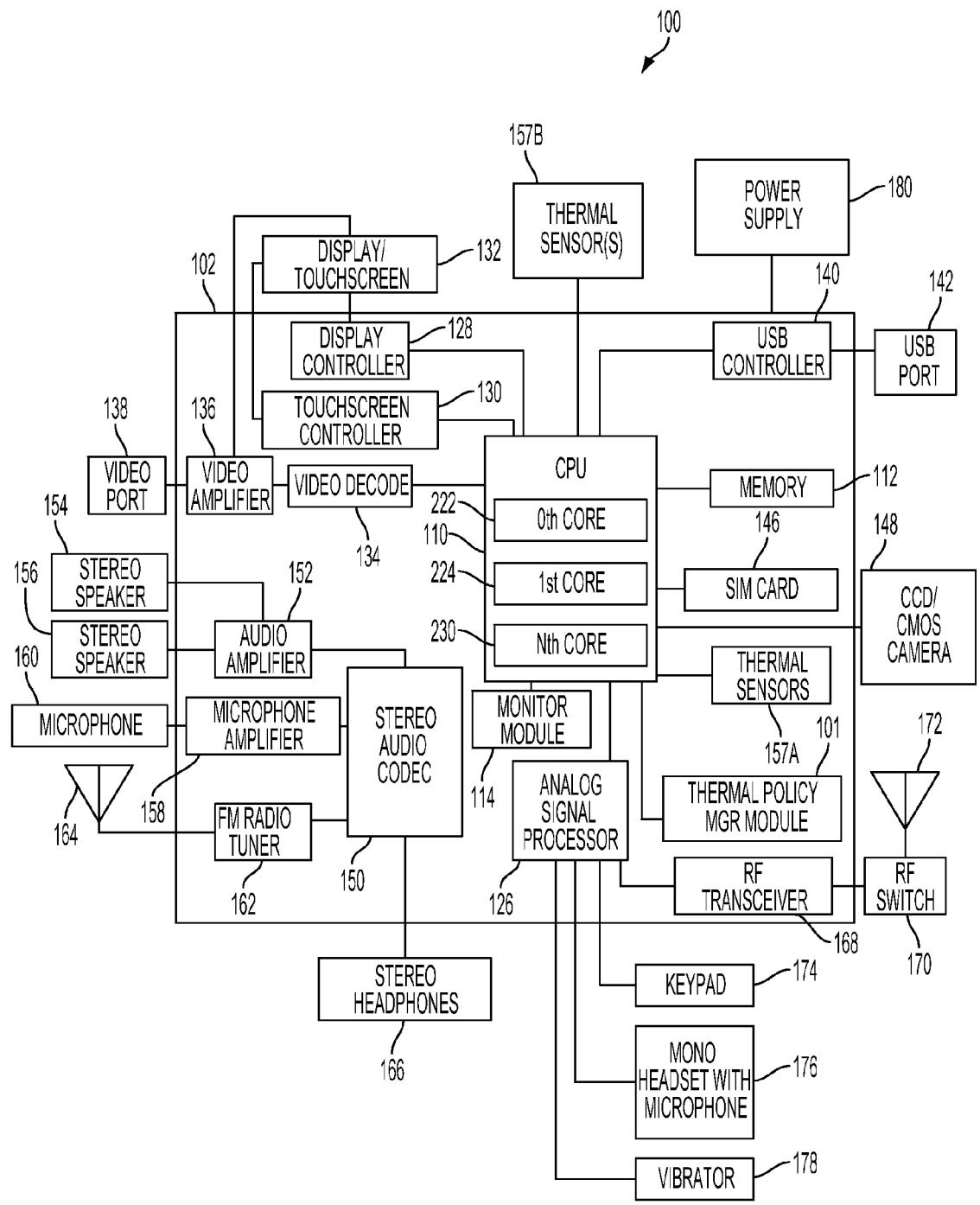
FIG. 1 is a functional block diagram illustrating an exemplary embodiment of a portable computing device (PCD).

The word "exemplary" or "illustrative" is used herein to mean "serving as an example, instance, or illustration." Any aspect described herein as "exemplary" or "illustrative" is not necessarily to be construed as preferred or advantageous over other aspects.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, and a laptop computer with a wireless connection, among others.

In this description, the terms "communication device," "wireless device," "wireless telephone," "wireless communication device" and "wireless handset" are used interchangeably. With the advent 3G and 4G wireless technology, greater bandwidth availability has enabled more portable computing devices with a greater variety of wireless capabilities. Therefore, a wireless device could be a cellular telephone, a pager, a PDA, a smartphone, a navigation device, or a computer with a wireless connection.

In this description, the term "application" in the context of software may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein may also include files that are not executable in nature, such as documents that may need to be opened or other data files that need to be accessed.

As used in this description, the terms "component," "database," "module," "system," and the like are intended to refer to a computer-related entity or element, either hardware, firmware, a combination of hardware and software, software, or software in execution. For example, a component may be, but is not limited to being, a processor, a process running on a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In FIG. 1, an exemplary PCD 100 in the form of a wireless telephone in which methods and systems for thermal mitigation are implemented is illustrated through an exemplary, non-limiting functional block diagram. As shown, the PCD 100 includes an on-chip system 102 that includes a multi-core central processing unit ("CPU") 110 and an analog signal processor 126 that are coupled together. The CPU 110 may comprise a zero$^{th}$ core 222, a first core 224, etc., through an N$^{th}$ core 230, as understood by one of ordinary skill in the art. Instead of a CPU 110, a digital signal processor ("DSP") may also be employed, as understood by one of ordinary skill in the art. As understood by one of ordinary skill in the art, these electronic elements and others described below produce heat during operation. Excessive heat may be detrimental to the electronic elements of PCD 100.

The CPU 110 may also be coupled to one or more internal, on-chip thermal sensors 157A as well as one or more external, off-chip thermal sensors 157B (collectively referred to as sensors 157). The on-chip thermal sensors 157A may comprise one or more proportional-to-absolute temperature ("PTAT") temperature sensors that are based on a vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter controller (not shown). However, other types of thermal sensors 157 may be employed without departing from the scope of the invention. The thermal sensors 157 may be distributed throughout the on-chip system 102 such that they may sense the heat emitted by various electronic circuit elements.

The thermal sensors 157 may be controlled and monitored by one or more thermal policy manager modules 101. The one or more thermal policy manager modules may comprise software which is executed by the CPU 110. However, a thermal policy manager module 101 may also be formed from hardware and/or firmware without departing from the scope of the invention.

In general, a thermal policy manager module 101 may be responsible for monitoring and applying thermal policies that include one or more thermal mitigation methods that may help the PCD 100 manage thermal conditions and/or thermal loads and avoid experiencing adverse thermal conditions, such as, for example, reaching critical temperatures, while maintaining a high level of functionality. In some instances, however, it may not be possible for a thermal policy manager module 101 to monitor a thermal sensor 157. For example, like any electronic element, thermal sensors 157 are subject to malfunction or degradation. Also, while one of the electronic elements in the PCD 100 may be primarily responsible for causing a critical heat level, there may be no thermal sensor 157 located sufficiently close to that electronic element (i.e., in thermal proximity) and apart from other electronic elements to distinguish the heat emitted by that electronic element from the heat emitted by the other electronic elements. As there are only a limited number of thermal sensors 157 in the PCD 100, it may not be possible to provide exactly one thermal sensor 157 in close thermal proximity to every electronic element that it would be desirable to monitor. It should also be noted that although in the exemplary embodiment the PCD 100 includes several thermal sensors 157, in other embodiments a PCD may not include any such thermal sensors.

FIG. 1 also shows that the PCD 100 may include a monitor module 114. The monitor module 114 communicates with one or more of the thermal sensors 157 and with the CPU 110 as well as with the thermal policy manager module 101. The thermal policy manager module 101 may work with the monitor module 114 to identify adverse thermal conditions and apply thermal policies that include one or more thermal mitigation methods as described in further detail below.

The method steps described herein may be implemented in whole or part by executable instructions stored in a memory 112 that form the one or more thermal policy manager modules 101. These instructions that form the thermal policy manager modules 101 may be executed by the CPU 110, the analog signal processor 126, or another processor or circuit element, to perform the methods described herein. Further, the processors 110 and 126, the memory 112, the instructions stored therein, or a combination thereof may serve as a means for performing one or more of the method steps described herein.

As illustrated in FIG. 1, the PCD 100 further includes a display controller 128 and a touchscreen controller 130 that are coupled to the digital signal processor 110. A touchscreen display 132 external to the on-chip system 102 is coupled to the display controller 128 and the touchscreen controller 130. The PCD 100 also includes a video decoder 134, a video amplifier 136 and a video port 138. The video decoder 134 is coupled to the CPU 110. The video amplifier 136 is coupled to the video decoder 134 and the touchscreen display 132. The video port 138 is coupled to the video amplifier 136. A universal serial bus ("USB") controller 140 is also coupled to the CPU 110. Also, a USB port 142 is coupled to the USB controller 140. The memory 112 and a subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio coder-decoder ("CODEC") 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

As further shown in FIG. 1, a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable direct current ("DC") battery or a DC power supply that is derived from an alternating current ("AC")-to-DC transformer that is connected to an AC power source.

The touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 102 in the exemplary embodiment shown in FIG. 1. However, it should be understood that the monitor module 114 may also receive one or more indications or signals from one or more of these external devices by way of the analog signal processor 126 and the CPU 110 to aid in the real time management of the resources operable on the PCD 100.

The thermal management methods described herein may be effected through the thermal policy manager module 101 or, alternatively or in addition, through the execution of software by the CPU 110. The various thermal sensors 157 may be positioned sufficiently adjacent to and in sufficient thermal communication (i.e., "in thermal proximity") with various hardware elements of the PCD 100, such as, for example, the CPU 110, the RF transceiver 168, and the RF switch 170, so that the hardware element associated with the sensed heat may be identified. The thermal policy manager 101 may assign one or more specific thermal mitigation methods unique to the hardware element associated with a particular thermal sensor 157. For example, the thermal mitigation method assigned to the CPU 110 may differ from the thermal mitigation method assigned to the RF switch 170.

Figure 2:
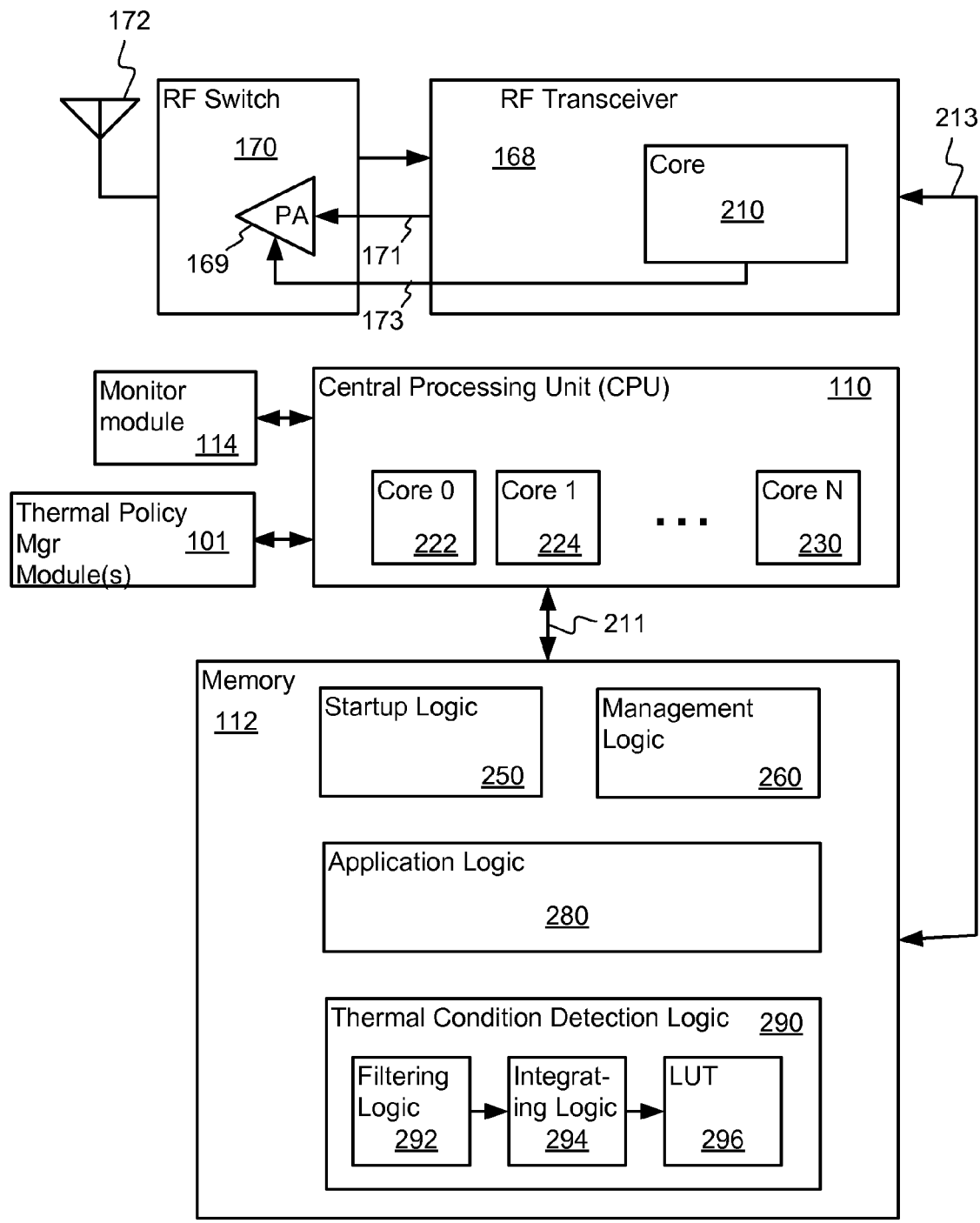
FIG. 2 is a schematic diagram illustrating an exemplary architecture of the PCD of FIG. 1 for supporting thermal mitigation.

As illustrated in FIG. 2, the CPU 110 is coupled to the memory 112 via a bus 211. The CPU 110, as noted above, is a multiple-core processor having N core processors (where N is an integer greater than one). As is known to one of ordinary skill in the art, each of the zero$^{th}$ core 222, first core 224, etc., through the N$^{th}$ core 230 is available for supporting a dedicated application or program. Alternatively, one or more applications or programs may be distributed for processing across two or more of the available cores.

The CPU 110 may receive commands from the thermal policy manager module 101, which may be embodied in hardware, software or a combination thereof. Software embodying the thermal policy manager module 101 may comprise instructions that are executed by the CPU 110. A process defined by the execution of such instructions by the CPU 110 may cause commands to be issued to other processes or application programs being executed by the CPU 110 or to other cores or processors.

The zero$^{th}$ core 222, the first core 224, etc., through the Nth core 230 of the CPU 110 may be integrated on a single integrated circuit die, or in other embodiments they may be integrated or coupled on separate dies in a multiple-circuit package. The zero$^{th}$ core 222, the first core 224, etc., through the N$^{th}$ core 230 may be coupled via one or more shared caches, and they may implement message or instruction passing via network topologies such as bus, ring, mesh and crossbar topologies.

In the exemplary embodiment, the RF transceiver 168 includes at least one processor, such as the core processor 210 (labeled "Core"). The RF transceiver 168 is coupled to the memory 112 via bus 213. The CPU 110 coordinates the transfer of information in digital form from the memory 112 to the RF transceiver 168 via bus 213. Some of the transferred information represents information to be wirelessly transmitted via the RF transceiver 168. Note that the output of the RF transceiver 168 includes a transmission signal 171 that is provided to the power amplifier 169 in the RF switch 170. The output of RF transceiver 168 also includes a power control signal 173 that is provided to the power amplifier 169. As understood by one of ordinary skill in the art, the power control signal 173 controls the amplification power with which the power amplifier 169 amplifies the transmission signal. Although not shown for purposes of clarity, the RF switch 170 includes circuitry that couples the output of the power amplifier 169 to the antenna 172. As understood by one of ordinary skill in the art, the power amplifier 169 generates heat that increases in amount with the amplification power and the sustained amount of time that the power amplifier 169 operates. That is, the amount of energy that the power amplifier 169 sinks is related to the product of the average amplification power and the sustained amount of time that the power amplifier 169 operates. Due to the inherent inefficiency of such electronic elements, much of the residual energy that is not emitted in the form of the amplified signal at the output of the power amplifier 169 is emitted in the form of heat. Thus, a correspondence exists between the power control signal 173 and the amount of heat generated by the power amplifier 169.

There is a similar correspondence between the amount of heat generated by the CPU 110 (or any of its individual cores 222, 224, 230, etc.) and a signal or metric that represents the amount of processing activity in the CPU 110 or core. For example, a signal or metric that represents the number of instructions per second that the CPU 110 executes may be related to the amount of heat that the CPU 110 generates. Such processing activity is commonly measured in millions of instructions per second or MIPS. Although MIPS is a common metric, any other metric that quantifies or measures a rate at which a processor performs an action may be related to the amount of heat that a processor generates. Note that the amount of energy that the CPU 110 sinks may be related to the product of a MIPS metric for the CPU 110 and the sustained amount of time that the CPU 110 operates.

Each of buses 211 and 213 may include multiple communication paths via one or more wired or wireless connections, as is known in the art. The buses 211 and 213 may have additional elements, which are not shown for purposes of clarity, such as controllers, buffers (caches), drivers, repeaters, and receivers, to enable communications. Further, the bus 211 and the bus 213 may include address, control, and/or data connections to enable appropriate communications among the aforementioned components.

Memory 112 is generally of a type in which software elements, such as data and programming code, are operated upon by the CPU 110. In accordance with conventional computing principles, the CPU 110 operates under the control of programming code, such as operating system code and application program code. In the exemplary embodiment such programming code, i.e., software elements, includes startup logic 250, management logic 260, application logic 280, and thermal condition detection logic 290, which are described below in further detail. In the exemplary embodiment, thermal condition detection logic 290 includes filtering logic 292, integrating logic 294 and lookup table logic 296. Although these software elements are conceptually shown for purposes of illustration as stored or residing in memory 112, it is understood that such software elements may not reside simultaneously or in their entireties in memory 112 but rather may be retrieved in portions via the CPU 110 on an as-needed basis, e.g., in code segments, files, instruction-by-instruction, or any other suitable basis, from any of the other sources of software or firmware shown in FIG. 1, such as the thermal policy manager module 101.

It should be noted that, as programmed with the above-described software elements or portions thereof, the combination of the CPU 110, the memory 112 (or other element or elements in which software elements are stored or reside) and any related elements generally defines a programmed processor system. It should also be noted that the combination of software elements and the computer-usable medium on which they are stored or in which they reside generally constitutes what is referred to in the patent lexicon as a "computer program product."

Although the memory 112 represents an exemplary computer-usable or computer-readable medium, more generally, a computer-readable medium is an electronic, magnetic, optical, electromagnetic, or semiconductor system, apparatus, device or other physical device or means that may contain or store a computer program and data for use by or in connection with a computer-related system or method. The various logic elements shown in FIG. 2 and other such logic elements may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a computer-readable medium may include any means that may store, communicate, propagate, or transport the information for use by or in connection with the instruction execution system, apparatus, or device.

Examples (i.e., a non-exhaustive list) of computer-readable media include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

Although in the exemplary embodiment the startup logic 250, management logic 260, application logic 280 and thermal condition detection logic 290 are software elements, in other embodiments they may be implemented with any or a combination of the following technologies, which are each well known in the art: a discrete logic circuit(s) having logic gates for implementing logic functions upon data signals, combination logic in an application specific integrated circuit (ASIC), a programmable gate array(s) (PGA), a field programmable gate array (FPGA), etc.

The startup logic 250 includes one or more executable instructions for selectively identifying, loading, and executing a select program for managing or controlling the performance of one or more of the available cores, 222, 224, 230, etc. The select program, when executed by one or more of the core processors in the CPU 110 may operate in accordance with one or more signals provided by the monitor module 114 in combination with control signals provided by the one or more thermal policy manager module(s) 101 to scale the performance of the respective processor core or other element. As described below, the performance of a processor may be scaled down or backed off as a way to mitigate the effects of excessive heat. In this regard, the monitor module 114 may provide one or more indicators of events, processes, applications, resource status conditions, elapsed time, as well as temperature as received from the thermal policy manager module 101.

The management logic 260 includes one or more executable instructions for terminating an operative performance scaling program on one or more of the respective processor cores or other elements, as well as selectively identifying, loading, and executing a more suitable replacement program for managing or controlling the performance of one or more of the available cores or other elements. A replacement program, when executed by one or more of the core processors in the digital signal processor or the core 210 in the RF transceiver 168, may operate in accordance with one or more signals provided by the monitor module 114 or one or more signals provided on the respective control inputs of the various processor cores to scale the performance of the respective processor core or other element.

One way in which the performance of a processor core may be scaled is to limit the MIPS by, for example, decreasing the frequency at which the process core operates. By reducing the processing activity in this way, the thermal policy manager 101 may reduce the power consumption of the core(s) 222, 224, 230, etc. The thermal policy manager 101 may choose to limit all of the N cores 222, 224, 230, etc., together, or it may select and choose which cores 222, 224, 230, etc., are to be scaled back while allowing other cores 222, 224, 230, etc., to operate in an unconstrained manner. The thermal policy manager 101, monitor module 114, and/or operating system (not shown) may make their decisions on which cores 222, 224, 230, etc., to control based on data received from thermal sensors 157 or software application requirements based, and/or best effort prediction.

Another way in which the performance of a processor core may be scaled is by, for example, shifting the processing activity load from a core that may be generating excessive heat to another core that may be generating less heat. The thermal mitigation method of spatial load shifting comprises the activation and deactivation of cores within a multi-core processor system. The processing activity load may be shifted periodically, in a manner that allows a less-active or inactive core to dissipate heat before shifting an increased processing activity load to it.

Exemplary thermal mitigation methods 300, 400, 600, 700 and 800 are described below with regard to the flow diagrams of FIGS. 3, 4, 6A-B, 7A-B and 8, respectively. Certain steps or acts in the methods or process flows described in this specification naturally precede others for the exemplary embodiments of the invention to function as described. However, the invention is not limited to the order of the steps or acts described in embodiments in which such order or sequence does not alter the functionality of the invention. That is, it is recognized that in other embodiments some steps may performed before, after, or parallel (i.e., substantially simultaneously with) other steps without departing from the scope and spirit of the invention. In other embodiments, certain steps may be omitted or not performed without departing from the invention. Also, words such as "thereafter", "then", "next", etc. are not intended to limit the order of the steps. Rather, these words are simply used to guide the reader through the description of the exemplary method.

It should be understood that, based on the flow diagrams and associated description in this specification, one of ordinary skill in programming is able to write or otherwise provide suitable software code or similar logic or to create or otherwise provide suitable hardware or similar logic to embody the disclosed invention without difficulty.

Figure 3:
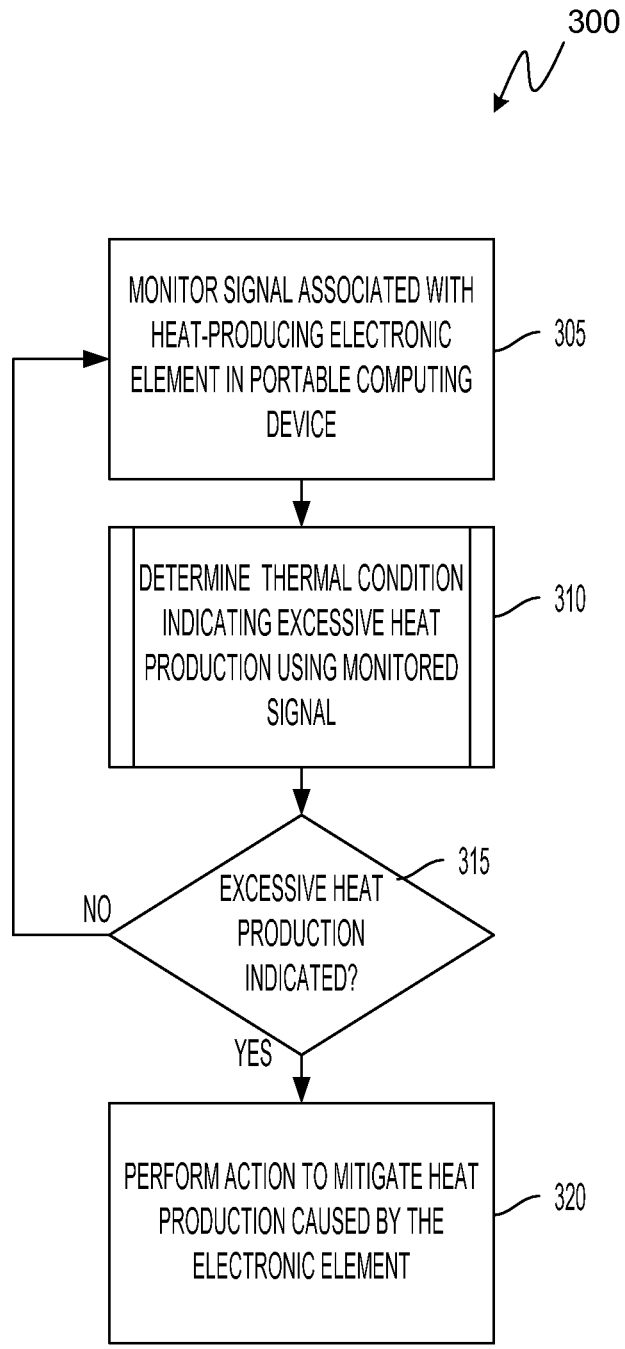
FIG. 3 is a flow diagram illustrating an exemplary method for thermal mitigation in the PCD of FIG. 1.

The exemplary method 300 that is illustrated in FIG. 3 may be performed or may occur at any suitable time during the operation of PCD 100 (FIG. 1). For example, the method 300 may occur essentially in parallel with other aspects of the operation of PCD 100, such as the wireless transmission and reception of information representing voice and data.

As indicated by block 305, a signal associated with a heat-producing electronic element in PCD 100 is monitored. The thermal policy manager module 101 may provide a means for performing this function. Alternatively, or in addition, the CPU 110 or the monitor module 114 may provide such a means. To monitor the signal, a sample of the signal may be read on a periodic basis, such as every fraction of a second. As such signal sampling is understood by one of ordinary skill in the art, selecting a suitable fraction or other sampling rate is well within the capabilities of persons skilled in the art. The samples may be stored in memory 112 for further processing. The signal that is monitored may be any signal for which there is a correspondence or relationship between the signal and the amount of heat produced by the associated electronic element, such as the power amplifier control signal 173 in the embodiment described below with regard to FIGS. 6A-B or the MIPS metric in the embodiment described below with regard to FIGS. 7A-B.

As indicated by block 310, a thermal condition indicating excessive heat production is determined in response to the monitored signal (e.g., using samples stored in memory 112). It should be understood that the term "excessive" is used in this context for convenience to indicate an amount of heat that may warrant analysis or processing to determine whether an action is to be taken, and not necessarily to indicate an amount of heat that exceeds some defined threshold. The CPU 110, operating in accordance with the thermal condition detection logic 290, may provide a means for performing this function.

As indicated by block 315, an action may or may not be taken, depending on the thermal condition that is determined. If the condition indicates that an action is to be taken, then an action is performed in PCD 100 to mitigate heat production, as indicated by block 320. If the condition does not indicate that an action is to be taken, then the signal continues to be monitored in accordance with block 305 as described above. It should be noted that regardless of whether an action is performed to mitigate heat production, the method 300 may be repeated. It should be noted that blocks 310 and 315 may occur in concert or in combination with each other, such that the outcome of determining the condition effectively determines whether an action is to be performed. That is, there may be no separately identifiable test for whether excessive heat production is indicated.

The method 300 may be repeated periodically, such as every few seconds or every second or fraction of a second, so that thermal mitigation is effectively continual during operation of the PCD 100 or a portion of its operation.

Figure 4:
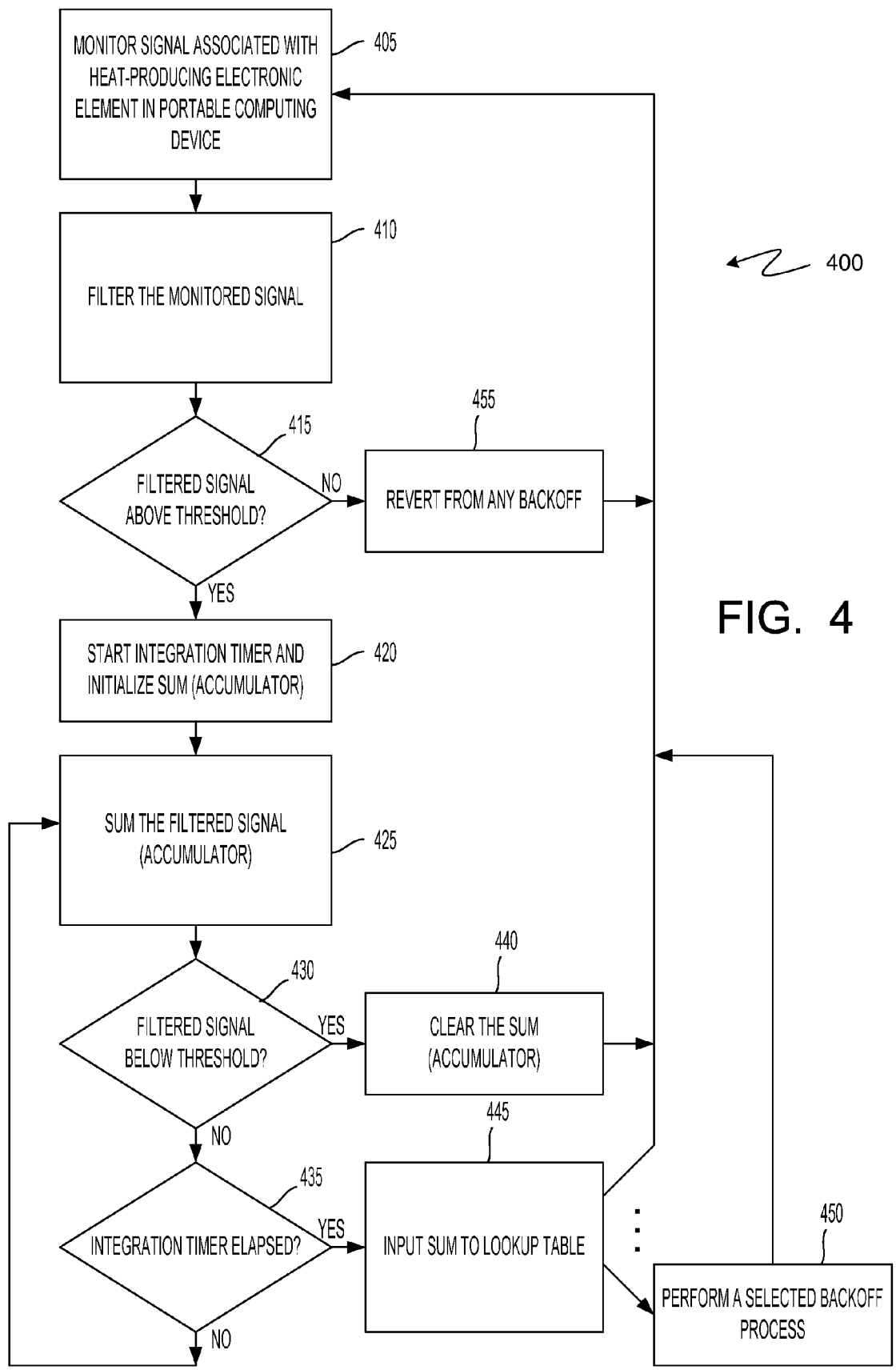
FIG. 4 is a flow diagram similar to FIG. 3, in which the exemplary method includes processing the monitored signal to determine a thermal condition indicating excessive heat production.

The exemplary method 400 that is illustrated in FIG. 4 may be performed or may occur at any suitable time during the operation of the PCD 100. For example, the method 400 may occur essentially in parallel with other aspects of the operation of PCD 100, such as the wireless transmission and reception of information representing voice and data. Method 400 is similar to method 300 but, as described in further detail below, includes processing the monitored signal as part of determining the thermal condition.

As indicated by block 405, a signal associated with a heat-producing electronic element in the PCD 100 is monitored. The thermal policy manager module 101 may provide a means for performing this function. Alternatively, or in addition, the CPU 110 or the monitor module 114 may provide such a means. The signal that is monitored may be any signal for which there is a correspondence or relationship between the signal and the amount of heat produced by the associated electronic element, such as the power amplifier control signal 173 in the embodiment described below with regard to FIGS. 6A-B or the MIPS metric in the embodiment described below with regard to FIGS. 7A-B.

As indicated by block 410, the processing of the monitored signal may include filtering. For example, the monitored signal may be low-pass filtered because thermal changes tend to occur much more slowly than the rate at which the signal may change. The CPU 110, operating in accordance with the filtering logic 292, may provide a means for performing this function.

As indicated by block 415, the processing may also include comparing the filtered signal with a predetermined or fixed threshold, to determine if further processing is warranted or indicated. If the filtered signal exceeds such a threshold, then the signal may be integrated or summed (i.e., accumulated) over a time interval. The CPU 110, operating in accordance with the integrating logic 292, may provide a means for performing this function. For example, a timer may be started, as indicated by block 420. A sample of the filtered signal may then be added to a sum (i.e., accumulated), as indicated by block 425. The samples may be accumulated or summed in this manner, as indicated by the loop formed by blocks 425, 430 and 435.

As indicated by block 435, the summing or integration continues until the timer elapses. The time interval (T) over which the samples are summed may be any suitable value, such as a few seconds or some fraction of a second. As indicated by block 430, if at any time during the integration the filtered signal falls below a threshold (which may be the same as the threshold described above with regard to block 415 or a different threshold), then the processing terminates. When the processing terminates in this manner, the sum or accumulator value is cleared, as indicated by block 440. When the timer elapses but processing has not yet otherwise terminated, processing may terminate in a different manner. When the processing terminates in this manner, the sum or result of the integration may be provided to the lookup table logic 296, as indicated by block 445. The result that is provided to the lookup table logic 296 represents a thermal condition indicating excessive heat production. The lookup table logic 296 determines if a heat production mitigation action is to be performed and, if so, which of one or more possible actions to perform.

Figure 5:
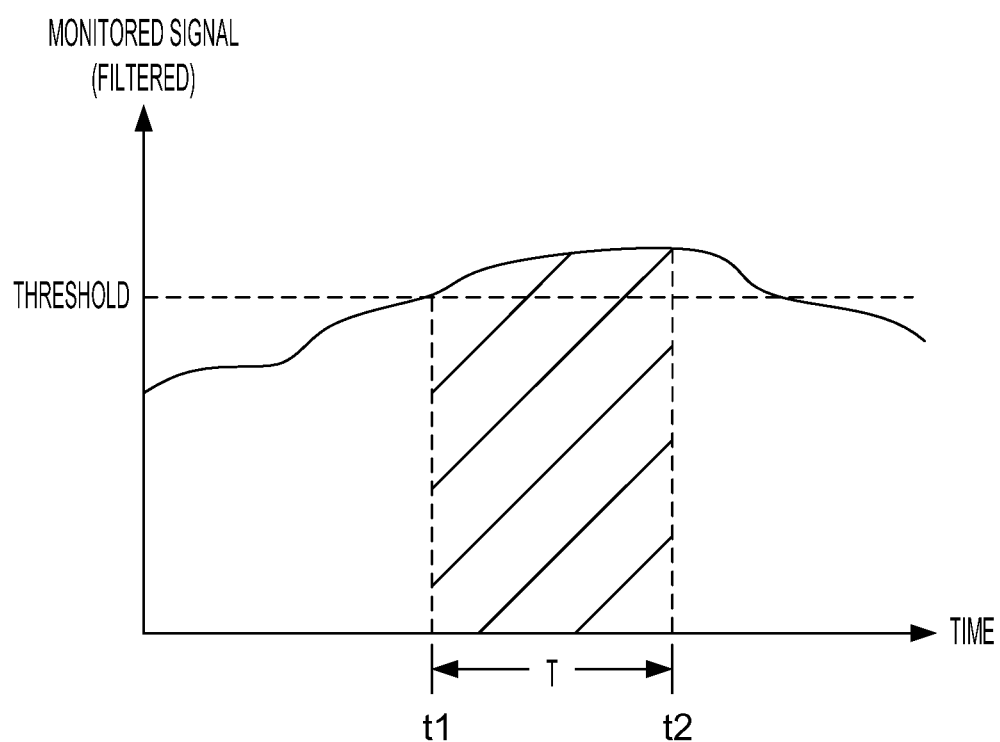
FIG. 5 is a graph illustrating an exemplary effect of the method of FIG. 3.

An example of the summing or integration of the filtered signal over a time interval (T) is illustrated by the graph of FIG. 5. Note that integration begins at a time t1 when the filtered signal exceeds a threshold and ends at a time t2 when the timer elapses. The hatched area of the graph under the curve representing the filtered signal is related to the amount of energy that the electronic element sinks during the time interval and is thus related to the heat that the electronic element generates.

The output of the lookup table logic 296 may indicate any of zero or more actions to mitigate heat production. That is, depending upon the result of the integration that is input to the lookup table logic 296, the output of the lookup table logic 296 may indicate performing no action at all or performing any one of several possible actions. In an instance in which no action is indicated, then the signal continues to be monitored in accordance with block 405 as described above. An example of an action that may be indicated is to perform a scaling or back-off process, as indicated by block 450. A back-off process may include backing off a control signal that is related to the heat that the electronic element generates. To "back off" a signal in this context broadly refers to changing an input to the electronic element in a way that reduces heat production. The CPU 110, may provide a means for performing a back-off function.

After a back-off process is performed as indicated by block 450, then the signal continues to be monitored in accordance with block 405 as described above. It is desired that the back-off process result in a reduction in the amount of heat generated by the electronic element associated with the monitored signal. As indicated by block 455, if the filtered signal does not exceed the threshold described above with regard to block 415, then the signal continues to be monitored in accordance with block 405 as described above. However, as indicated by block 455, before continuing monitoring, any back-off process that was previously performed may be reversed or reverted from, since the filtered signal being below the threshold may indicate that a back-off process was effective in lowering the temperature. Although not shown, a timer or filter may be included so that a back-off process is only reversed if the filtered signal is below the threshold for some predetermined amount of time. The method 400 may be repeated periodically, such as every few seconds or some fraction of a second, so that thermal mitigation is effectively continual during operation of PCD 100 or a portion of its operation.

The exemplary method 600 that is illustrated in FIG. 6 may be performed or may occur at any suitable time during the operation of PCD 100 (FIG. 1). For example, the method 600 may occur essentially in parallel with other aspects of the operation of PCD 100, such as the wireless transmission and reception of information representing voice and data. Method 600 is similar to method 400 but, as described in further detail below, relates to embodiments in which the monitored signal is the power amplifier control signal 173 (FIG. 1).

As indicated by block 605, the power amplifier control signal 173 is monitored. The core 210 of the RF transceiver 168 may cause sampled values of the power amplifier control signal 173 or a metric derived from such sampled values to be transferred to memory 112. Note that there is a correspondence or relationship between the power amplifier control signal 173 and the amount of heat produced by the power amplifier 169.

As indicated by block 610, the processing of the power amplifier control signal 173 may include filtering. For example, power amplifier control signal 173 may be low-pass filtered because thermal changes tend to occur much more slowly than the rate at which this signal may change.

As indicated by block 615, the processing may also include comparing the filtered signal with a predetermined or fixed threshold, to determine if further processing is warranted or indicated. If the filtered signal exceeds such a threshold, then the signal may be integrated or summed (i.e., accumulated) over a time interval. A timer may be started, as indicated by block 620. A sample of the filtered signal may be added to a sum (i.e., accumulated), as indicated by block 625. The samples may be accumulated or summed in this manner, as indicated by the loop formed by blocks 625, 630 and 635.

As indicated by block 635, the summing or integration continues until the timer elapses. The time interval (T) over which the samples are summed may be any suitable value, such as a few seconds or some fraction of a second. As indicated by block 630, if at any time during the integration the filtered signal falls below a threshold (which may be the same as the threshold described above with regard to block 615 or a different threshold), then the processing terminates. When the processing terminates in this manner, the sum or accumulator value is cleared, as indicated by block 640. When the timer elapses but processing has not yet otherwise terminated, processing may terminate in a different manner. When the processing terminates in this manner, the sum or result of the integration may be provided to the lookup table logic 296, as indicated by block 645. Note that the amount of energy that the power amplifier 169 sinks, and accordingly the amount of heat that it generates, is related to the product of the amplification power and the amount of time during which amplification at such power levels is sustained. The result of the above-described summing or integration effectively represents such a product. The result also represents a thermal condition indicating excessive heat production.

The output of the lookup table logic 296 may indicate that any of zero or more actions to mitigate heat production are to be performed. That is, depending on the result of the integration that is input to the lookup table logic 296, the output of the lookup table logic 296 may indicate performing no action at all or performing any one of several possible actions, such as performing one or more back-off processes.

Lookup table logic 296 may be constituted by any suitable means, such as by empirically taking measurements of the temperature of the power amplifier 169 over a range of various amplification power levels that are sustained for various time intervals. Combinations of amplification power level (as represented by corresponding level of the power control signal 173) and temperatures that are believed to be detrimental to the electronics may be related in lookup table logic 296 to a corresponding heat-mitigating back-off process or other action. The output of the lookup table logic 296 may indicate any of several such actions, depending on the severity of the thermal condition. For example, if the input to the lookup table logic 296 represents the power amplifier 169 having drawn a large amount of energy within a certain amount of time (e.g., time interval (T) in FIG. 5), then the processes that are backed off may include those that have the greatest potential thermal mitigation impact. However, if the input to the lookup table logic 296 represents the power amplifier 169 having received a lesser amount of energy within the time interval, then the processes that are backed off may include those that have a less potential thermal mitigation impact. A tradeoff that may be included in the lookup table logic 296 may take into account that backing off processes in a way that potentially achieves a large thermal mitigation impact may tend to reduce the performance of PCD 100 to a greater extent than backing off processes in a way that potentially achieves a smaller thermal mitigation impact.

Figure 6A:
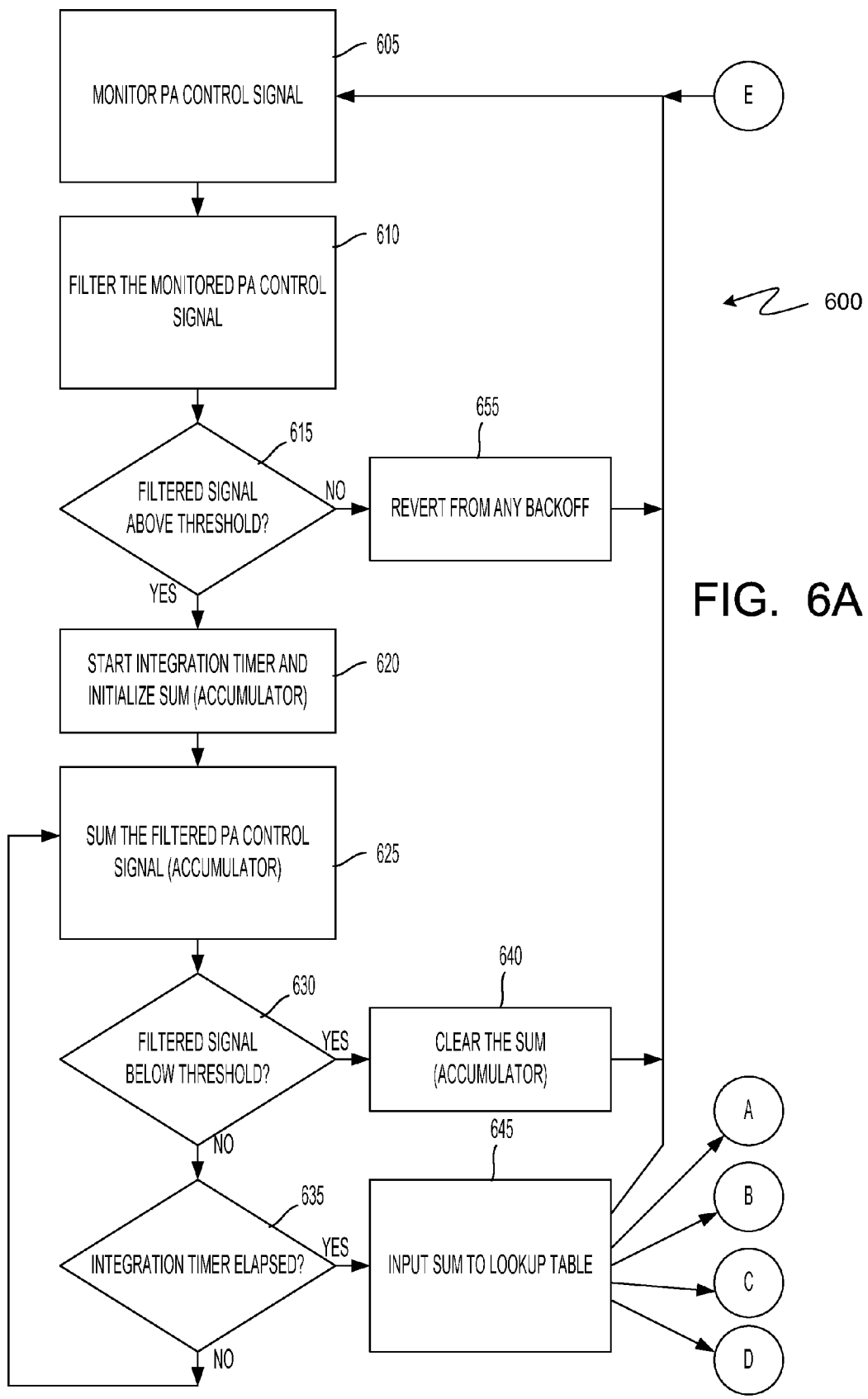
FIG. 6A is a flow diagram similar to FIG. 4, in which the monitored signal is a power amplifier control signal.
Figure 6B:
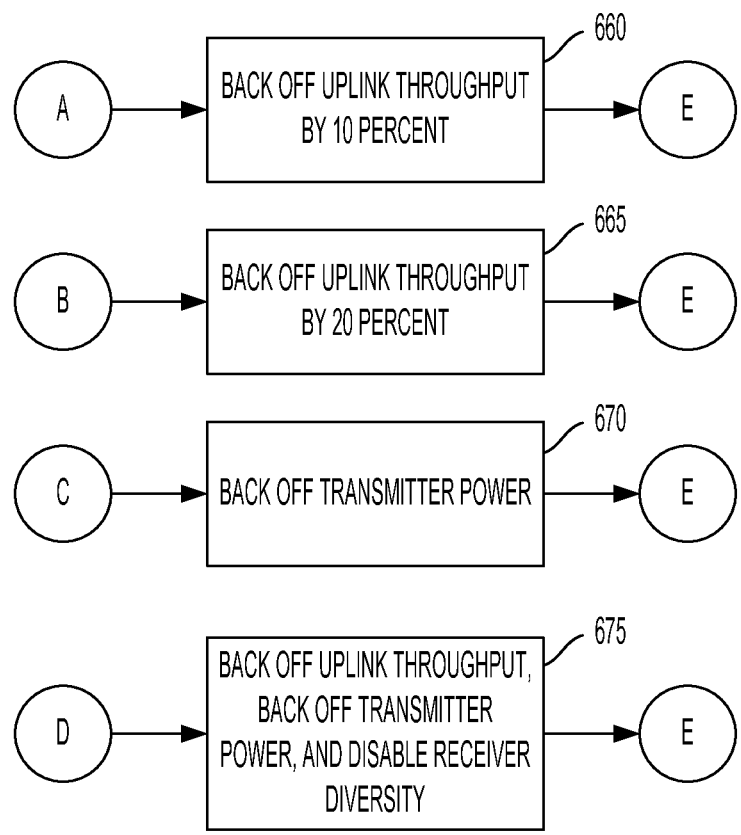
FIG. 6B is a continuation of the flow diagram of FIG. 6A, with off-page connectors indicating the flow between FIGS. 6A and 6B being labeled A, B, C, D and E.

Some exemplary back-off processes are indicated by blocks 660, 665, 670 and 675 (FIG. 6B). For example, as indicated by block 660, a back-off process having a relatively small potential thermal mitigation impact may include backing off the uplink throughput by, for example, ten percent. As understood by one of ordinary skill in the art, backing off or reducing the uplink throughput, which is a measure of transmitted information, may potentially result in lower heat generation. As indicated by block 665, a back-off process having a somewhat higher potential thermal mitigation impact may include backing off the uplink throughput by, for example, twenty percent. In addition to backing off or reducing uplink throughput, it is known that directly backing off or reducing transmitter power at the power amplifier may result in lower heat generation. Thus, as indicated by block 670, another exemplary back-off process may include reducing transmitter power at the power amplifier. Transmitter power may be reduced at the power amplifier by changing the power control signal 173 or by other means known in the art. Such back-off processes may include multiple processes, such as backing off both uplink throughput and disabling receiver diversity, as indicated by block 675. Thus, a back-off process having a large potential thermal mitigation potential might include backing off, reducing or disabling multiple functions or processes within PCD 100. The above-described back-off processes are intended only as examples, and others will occur readily to one of ordinary skill in the art in view of these examples.

After a back-off process or other thermal mitigation action is performed, or if it is determined that no back-off process or other thermal mitigation action is to be performed, then the signal continues to be monitored in accordance with block 605 as described above. It is desired that the back-off process result in a reduction in the amount of heat generated by the electronic element associated with the monitored signal. As indicated by block 655, if the filtered signal does not exceed the threshold described above with regard to block 615, then the power control signal 173 continues to be monitored in accordance with block 605 as described above. However, as indicated by block 655, before continuing monitoring, any back-off process that was previously performed may be reversed or reverted from, since the filtered signal being below the threshold may indicate that a back-off process was effective in lowering the temperature. Although not shown, a timer or filter may be included so that a back-off process is only reversed if the filtered power control signal is below the threshold for some predetermined amount of time. The method 600 may be repeated periodically, such as every few seconds or some fraction of a second, so that thermal mitigation is effectively continual during operation of PCD 100 or a portion of its operation.

The exemplary method 700 that is illustrated in FIG. 7 may be performed or may occur at any suitable time during the operation of PCD 100 (FIG. 1). For example, the method 700 may occur essentially in parallel with other aspects of the operation of PCD 100, such as the wireless transmission and reception of information representing voice and data. Method 700 is similar to methods 400 and 600 but, as described in further detail below, relates to embodiments in which the monitored signal is a metric or measurement of processing activity in the CPU 110 or one or more of its constituent cores (FIG. 1).

As indicated by block 705, a signal representing processing activity in the CPU 110 is monitored. In the CPU 110 processing activity may be characterized as the rate at which the CPU 110 executes instructions. As understood by one of ordinary skill in the art, processing activity may be expressed by a MIPS metric that represents the number of (millions of) instructions that the CPU 110 executes per second (i.e., millions of instructions per second or MIPS). Thus, the MIPS metric is a type of metric that represents a rate at which processing actions occur in the CPU 110. In other embodiments, other types of processing actions may be monitored. For example, in an instance in which the processor associated with the monitored signal or metric is not the CPU 110 but rather is a graphics processing unit (not shown), the rate at which such a GPU generates graphics frames (e.g., a frames per second metric) may be monitored. The monitor module 114 may serve as a means for monitoring the processing activity of the CPU 110. The CPU 110 may cause the MIPS metric to be transferred to memory 112. Note that there is a correspondence or relationship between the rate of processing actions and the amount of heat produced by the CPU 110.

As indicated by block 710, the processing of the monitored processing activity signal may include filtering. For example, a signal representing the rate of processing actions in CPU 110 may be low-pass filtered because thermal changes tend to occur much more slowly than the rate at which this signal may change.

As indicated by block 715, the processing may also include comparing the filtered signal with a predetermined or fixed threshold, to determine if further processing is warranted or indicated. If the filtered signal exceeds such a threshold, then the signal may be integrated or summed (i.e., accumulated) over a time interval. A timer may be started, as indicated by block 720. A sample of the filtered signal may be added to a sum (i.e., accumulated), as indicated by block 725. The samples may be accumulated or summed in this manner, as indicated by the loop formed by blocks 725, 730 and 735.

As indicated by block 735, the summing or integration continues until the timer elapses. The time interval (T) over which the samples are summed may be any suitable value, such as a few seconds or some fraction of a second. As indicated by block 730, if at any time during the integration the filtered signal falls below a threshold (which may be the same as the threshold described above with regard to block 715 or a different threshold), then the processing terminates. When the processing terminates in this manner, the sum or accumulator value is cleared, as indicated by block 740. When the timer elapses but processing has not yet otherwise terminated, processing may terminate in a different manner. When the processing terminates in this manner, the sum or result of the integration may be provided to the lookup table logic 296, as indicated by block 745. Note that the amount of energy that the CPU 110 consumes, and accordingly the amount of heat that it generates, is related to the product of the processing activity and the amount of time during which such processing activity levels are sustained. The result of the above-described summing or integration effectively represents such a product. The result also represents a thermal condition indicating excessive heat production.

The output of the lookup table logic 296 may indicate that any of zero or more actions to mitigate heat production are to be performed. That is, depending on the result of the integration that is input to the lookup table logic 296, the output of the lookup table logic 296 may indicate performing no action at all or performing any one of several possible actions, such as performing one or more back-off processes.

The lookup table logic 296 may be constituted by any suitable means, such as by empirically taking measurements of the temperature of the CPU 110 over a range of various processing activity levels that are sustained for various time intervals. Combinations of processing activity level (as represented by, for example, a MIPS metric) and temperatures that are believed to be detrimental to the electronics may be related in lookup table logic 296 to a corresponding heat-mitigating back-off process or other action. The output of the lookup table logic 296 may indicate any of several such actions, depending on the severity of the thermal condition. For example, if the input to the lookup table logic 296 represents the CPU 110 having consumed a relatively large amount of energy within a certain amount of time, then the processes that are backed off may include those that have the greatest potential thermal mitigation impact.

However, if the input to the lookup table logic 296 represents the CPU 110 having consumed a lesser amount of energy within the time interval, then the processes that are backed off may include those that have a less potential thermal mitigation impact. A tradeoff that may be included in the lookup table logic 296 may take into account that backing off processes in a way that potentially achieves a large thermal mitigation impact may tend to reduce the performance of the PCD 100 to a greater extent than backing off processes in a way that potentially achieves a smaller thermal mitigation impact.

Figure 7A:
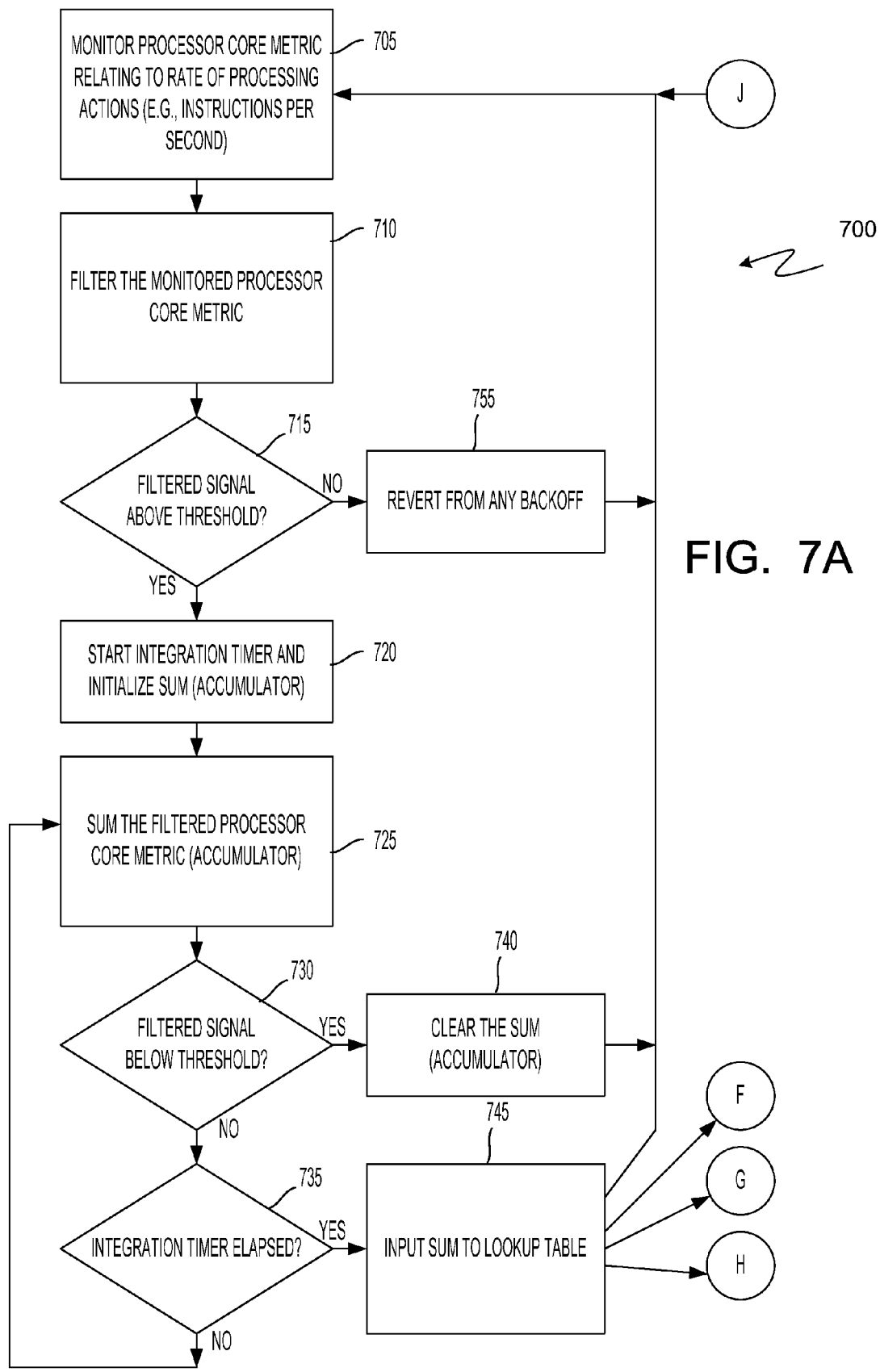
FIG. 7A is a flow diagram similar to FIG. 4, in which the monitored signal is a processor metric relating to a rate of processing action.
Figure 7B:
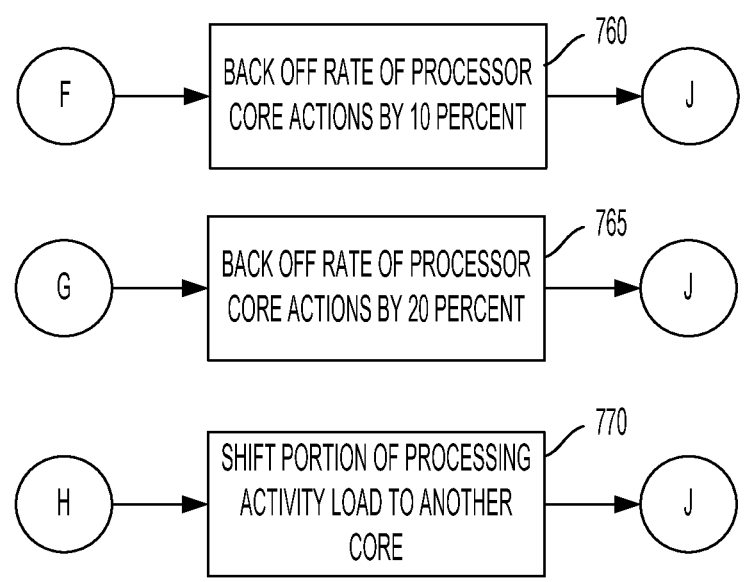
FIG. 7B is a continuation of the flow diagram of FIG. 7A, with off-page connectors indicating the flow between FIGS. 7A and 7B being labeled F, G, H and J.

Some exemplary back-off processes are indicated by blocks 760 and 765 (FIG. 7B). For example, as indicated by block 760, a back-off process having a relatively small potential thermal mitigation impact may include backing off the rate at which the CPU 110 performs the processing actions by, for example, a modest ten percent. As understood by one of ordinary skill in the art, backing off or reducing processing activity may potentially result in lower heat generation. As indicated by block 765, a back-off process having a somewhat higher potential thermal mitigation impact may include backing off the rate at which the CPU 110 performs the processing actions by, for example, twenty percent. Note that the processing activity of each core of the CPU 110 may be adjusted independently of the other cores. Thus, if the processing activity in one core is backed off, the processing activity in another core may be increased accordingly, to minimize the impact on the overall performance of the PCD 100. That is, processing activity may be shifted from one core to another, as indicated by block 770. The above-described back-off processes are intended only as examples, and other suitable back-off or scaling processes that potentially reduce the amount of heat that is generated will occur readily to persons skilled in the art in view of these examples.

After a back-off process or other thermal mitigation action is performed, or if it is determined that no back-off process or other thermal mitigation action is to be performed, then the signal continues to be monitored in accordance with block 705 as described above. It is desired that the back-off process result in a reduction in the amount of heat generated by the electronic element associated with the monitored signal. As indicated by block 755, if the filtered signal does not exceed the threshold described above with regard to block 715, then the processing activity signal continues to be monitored in accordance with block 605 as described above. However, as indicated by block 755, before continuing monitoring, any back-off process that was previously performed may be reversed or reverted from, since the filtered signal being below the threshold may indicate that a back-off process was effective in lowering the temperature. Although not shown, a timer or filter may be included so that a back-off process is only reversed if the filtered power control signal is below the threshold for some predetermined amount of time. The method 700 may be repeated periodically, such as every few seconds or some fraction of a second, so that thermal mitigation is effectively continual during operation of the PCD 100 or a portion of its operation.

The above-described exemplary "sensorless" heat mitigation methods, in which a signal associated with an electronic element is monitored, a thermal condition indicating excessive heat production is determined from the monitored signal (rather than from a sensor reading), and an action is performed to mitigate heat production, may be especially useful in instances in which the use of the thermal sensors 157 (FIG. 1) is not available or only of limited availability. However, in some instances, the above-described sensorless heat mitigation methods may be used in combination with heat mitigation methods that use sensors, such as thermal sensors 157 (FIG. 1).

Figure 8:
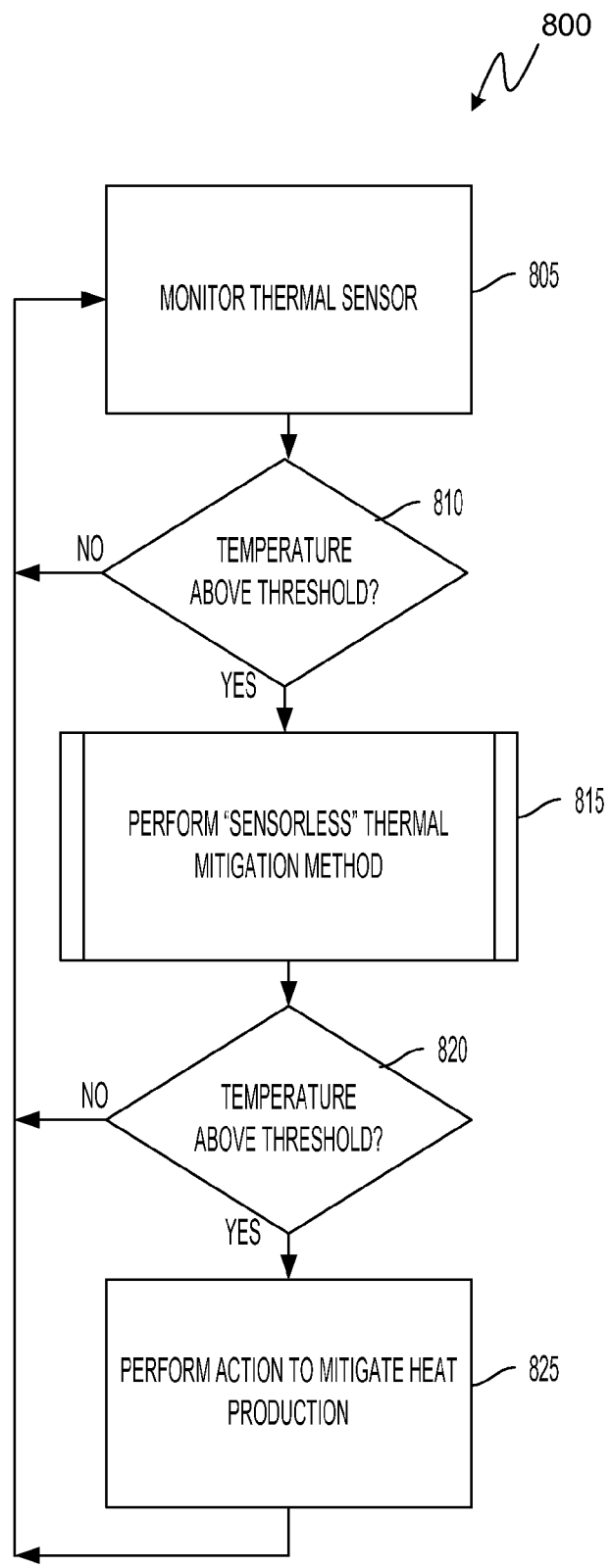
FIG. 8 is a flow diagram illustrating another exemplary method for thermal mitigation in the PCD of FIG. 1.

As described above, for example, the thermal sensors 157 may not be distributed in PCD 100 in a manner that allows heat production mitigation actions to be focused upon the electronic elements that are the major contributors to the excessive heat production. Some electronic elements may have thermal sensors 157 in sufficiently close thermal proximity to them to facilitate focusing heat production mitigation actions upon them, while other electronic elements may not have any thermal sensors 157 in sufficiently close thermal proximity. As illustrated in FIG. 8, a method 800 may be employed to estimate whether sensed heat is produced by an electronic element other than the one with which the monitored signal is associated.

As indicated by block 805, a thermal sensor 157 is monitored. As indicated by block 810, if the temperature indicated by the monitored thermal sensor 157 does not exceed a threshold, then the thermal sensor 157 continues to be monitored. However, if the temperature indicated by the monitored thermal sensor 157 exceeds a threshold, then one of the above-described "sensorless" thermal mitigations methods 300, 400, 600 or 700 is performed, as indicated by block 815. As in those methods, a signal associated with an electronic element is monitored, such as the power amplifier control signal 173 or a MIPS metric. Note that the sensorless heat mitigation method may or may not result in a reduction in the sensed temperature, depending on whether the electronic element associated with the monitored signal is primarily responsible for the increased temperature. If, as indicated by block 820, the temperature monitored by the thermal sensor 157 no longer exceeds the threshold, then the sensorless heat mitigation method was likely effective, and the thermal sensor 157 continues to be monitored (block 805). However, if the temperature monitored by the thermal sensor 157 continues to exceed the threshold, then the sensorless heat mitigation method was likely ineffective because an electronic element other than the one associated with the monitored signal was primarily responsible for the increased temperature. Therefore, an action is performed to mitigate heat production, as indicated by block 825. The thermal mitigation action may be directed to an electronic element other than the electronic element associated with the monitored signal. The thermal mitigation action may be directed to an electronic element or small group of elements that is in close thermal proximity to the thermal sensor 157 or, alternatively, to a wider group of electronic elements. The thermal mitigation action may include backing off one or more processes, as described above, or any other suitable thermal mitigation action.

Although selected aspects have been illustrated and described in detail, it will be understood that various substitutions and alterations may be made therein without departing from the spirit and scope of the present invention, as defined by the following claims.

What is claimed is:

1. A method for thermal mitigation in a portable computing device, the method comprising:
    monitoring a signal associated with an electronic element in the portable computing device, wherein the electronic element is a heat producing element, the signal is generated in response to an event other than a temperature measurement, and a correspondence exists between the signal and an amount of heat produced by the electronic element;
    determining that the signal has exceeded an initial threshold;
    in response to the signal exceeding the initial threshold, accumulating samples of the signal over a time interval;
    determining that a sum of values of the accumulated samples of the signal has exceeded a second threshold within the time interval;
    determining a thermal condition indicating excessive heat production in response to the sum of values of the accumulated samples of the signal exceeding the second threshold within the time interval; and
    performing a first action to mitigate heat production by the electronic element associated with the monitored signal, in response to the thermal condition indicating excessive heat production.

2. The method of claim 1, wherein accumulating samples of the signal over the time interval comprises an integration of the signal over time.

3. The method of claim 1, further comprising filtering the monitored signal, and wherein determining that the signal has exceeded the initial threshold comprises determining that the filtered signal has exceeded the initial threshold.

4. The method of claim 1, wherein determining the thermal condition indicating excessive heat production comprises providing the sum of the accumulated samples of the signal as an input to a lookup table, and the first action is determined as a result of an output of the lookup table.

5. The method of claim 1, further comprising:
    further monitoring the signal after performing the first action to determine if the amount of heat produced by the electronic element has decreased; and
    performing a second action reversing at least a portion of the first action if it is determined that the amount of heat produced by the electronic element has decreased.

6. The method of claim 1, wherein:
    the signal is a measurement of processing activity in the electronic element; and
    the amount of heat produced by the electronic element increases as processing activity increases.

7. The method of claim 6, wherein:
    the electronic element is a processor core, and the measurement of processing activity is related to a rate of processing actions; and
    the first action includes controlling the processor core to reduce the rate of processing actions.

8. The method of claim 7, further comprising:
    further monitoring the measurement of processing activity and determining the thermal condition indicating excessive heat production after reducing the rate of processing actions to determine if the amount of heat produced by the processor core has decreased; and
    controlling the processor core to increase the rate of processing actions if the amount of heat produced by the electronic element has decreased.

9. A system for thermal mitigation in a portable computing device, the system comprising:
    a heat producing electronic element; and
    a processor operable to:
        monitor a signal associated with an electronic element in the portable computing device, wherein the signal is generated in response to an event other than a temperature measurement and a correspondence exists between the signal and an amount of heat produced by the electronic element;
        determine that the signal has exceeded an initial threshold;
        in response to the signal exceeding the initial threshold, accumulate samples of the signal over a time interval;
        determine that a sum of values of the accumulated samples of the signal has exceeded a second threshold within the time interval;
        determine a thermal condition indicating excessive heat production in response to the sum of values of the accumulated samples of the signal exceeding the second threshold within the time interval; and
        perform a first action to mitigate heat production by the electronic element associated with the monitored signal, in response to the thermal condition indicating excessive heat production.

10. The system of claim 9, wherein the processor accumulating samples of the signal over the time interval comprises an integration of the signal over time.

11. The system of claim 9, wherein the processor filters the monitored signal and then determines that the filtered signal has exceeded the initial threshold.

12. The system of claim 9, wherein the processor determining the condition indicating excessive heat production comprises providing the sum of the accumulated samples of the signal as an input to a lookup table, and the first action is determined as a result of an output of the lookup table.

13. The system of claim 9, wherein the processor is further operable to:
further monitor the signal after performing the first action to determine if the amount of heat produced by the electronic element has decreased; and
perform a second action reversing at least a portion of the first action if it is determined that the amount of heat produced by the electronic element has decreased.

14. The system of claim 9, wherein:
the signal is a measurement of processing activity in the electronic element; and
the amount of heat produced by the electronic element increases as processing activity increases.

15. The system of claim 14, wherein:
the electronic element is a processor core, and the measurement of processing activity is related to a rate of processing actions; and
the first action includes controlling the processor core to reduce the rate of processing actions.

16. The system of claim 15, wherein the processor is further operable to:
further monitor the measurement of processing activity and determine the condition indicating excessive heat production after reducing the rate of processing actions to determine if the amount of heat produced by the processor core has decreased; and
control the processor core to increase the rate of processing actions if the amount of heat produced by the electronic element has decreased.

17. A system for thermal mitigation in a portable computing device, the system comprising:
means for monitoring a signal associated with an electronic element in the portable computing device, wherein the electronic element is a heat producing element, the signal is generated in response to an event other than a temperature measurement, and a correspondence exists between the signal and an amount of heat produced by the electronic element;
means for determining that the signal has exceeded an initial threshold;
means for accumulating samples of the signal over a time interval, in response to the signal exceeding the initial threshold;
means for determining that a sum of values of the accumulated samples of the signal has exceeded a second threshold within the period of time;
means for determining a thermal condition indicating excessive heat production in response to the sum of values of the accumulated samples of the signal exceeding the second threshold within the time interval; and
means for performing a first action to mitigate heat production by the electronic element associated with the monitored signal, in response to the condition indicating excessive heat production.

18. The system of claim 17, wherein the means for accumulating samples of the signal over the time interval comprises an integration of the signal over time.

19. The system of claim 17, further comprising means for filtering the monitored signal, and wherein the means for determining that the signal has exceeded the initial threshold comprises means for determining that the filtered signal has exceeded the initial threshold.

20. The system of claim 17, wherein the means for determining the thermal condition indicating excessive heat production includes a lookup table.

21. The system of claim 17, further comprising:
means for further monitoring the signal after performing the first action to determine if the amount of heat produced by the electronic element has decreased; and
means for performing a second action reversing at least a portion of the first action if it is determined that the amount of heat produced by the electronic element has decreased.

22. The system of claim 17, wherein:
the signal is a measurement of processing activity in the electronic element; and
the amount of heat produced by the electronic element increases as processing activity increases.

23. The system of claim 22, wherein:
the electronic element is a processor core, and the measurement of processing activity is related to a rate of processing actions; and
the first action includes controlling the processor core to reduce the rate of processing actions.

24. The system of claim 23, further comprising:
means for further monitoring the measurement of processing activity and determining the thermal condition indicating excessive heat production after reducing the rate of processing actions to determine if the amount of heat produced by the processor core has decreased; and
means for controlling the processor core to increase the rate of processing actions if the amount of heat produced by the electronic element has decreased.

25. A computer program product comprising a non-transitory computer-usable medium having computer-readable program code embodied therein, the computer-readable program code adapted to be executed to implement a method for thermal mitigation in a portable computing device, the method comprising:
monitoring a signal associated with an electronic element in the portable computing device, wherein the electronic element is a heat producing element, the signal is generated in response to an event other than a temperature measurement, and a correspondence exists between the signal and an amount of heat produced by the electronic element;
determining that the signal has exceeded an initial threshold;
in response to the signal exceeding the initial threshold, accumulating samples of the signal over a time interval;
determining that a sum of values of the accumulated samples of the signal has exceeded a second threshold within the time interval;
determining a thermal condition indicating excessive heat production in response to the sum of values of the accumulated samples of the signal exceeding the second threshold within the time interval; and
performing a first action to mitigate heat production by the electronic element associated with the monitored signal, in response to the condition indicating excessive heat production.

26. The computer program product of claim 25, wherein accumulating samples of the signal over the time interval comprises an integration of the signal over time.

27. The computer program product of claim 25, further comprising filtering the monitored signal, and wherein determining that the signal has exceeded the initial threshold comprises determining that the filtered signal has exceeded the initial threshold.

28. The method of claim 25, wherein determining the thermal condition indicating excessive heat production comprises providing the sum of the accumulated samples of the signal as an input to a lookup table, and the first action is determined as a result of an output of the lookup table.

29. The computer program product of claim 25, wherein the method implemented by execution of the computer-readable program code further comprises:
further monitoring the signal after performing the first action to determine if the amount of heat produced by the electronic element has decreased; and
performing a second action reversing at least a portion of the first action if it is determined that the amount of heat produced by the electronic element has decreased.

30. The computer program product of claim 25, wherein:
the signal is a measurement of processing activity in the electronic element; and
the amount of heat produced by the electronic element increases as processing activity increases.

31. The computer program product of claim 30, wherein:
the electronic element is a processor core, and the measurement of processing activity is related to a rate of processing actions; and
the first action includes controlling the processor core to reduce the rate of processing actions.

32. The computer program product of claim 31, wherein the method implemented by execution of the computer-readable program code further comprises:
further monitoring the measurement of processing activity and determining the thermal condition indicating excessive heat production after reducing the rate of processing actions to determine if the amount of heat produced by the processor core has decreased; and
controlling the processor core to increase the rate of processing actions if the amount of heat produced by the electronic element has decreased.

* * * * *